Aug. 5, 1969        J. W. HOLZMAN        3,459,037
DYNAMIC ROAD SIMULATOR
Filed Nov. 14, 1966                       4 Sheets-Sheet 1
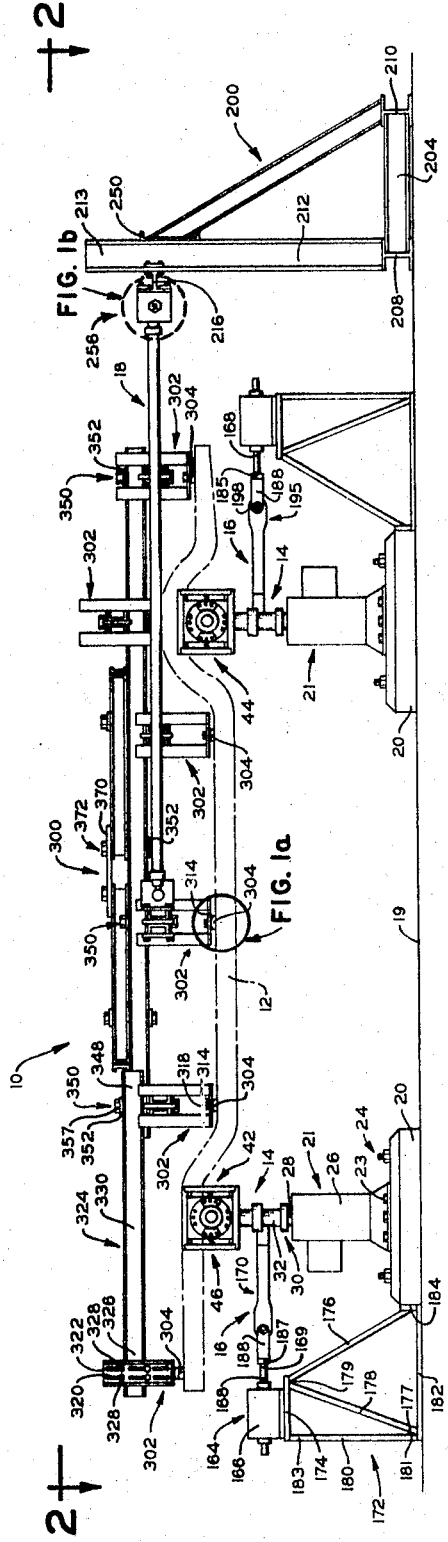
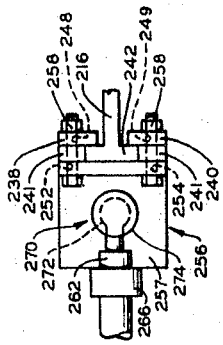
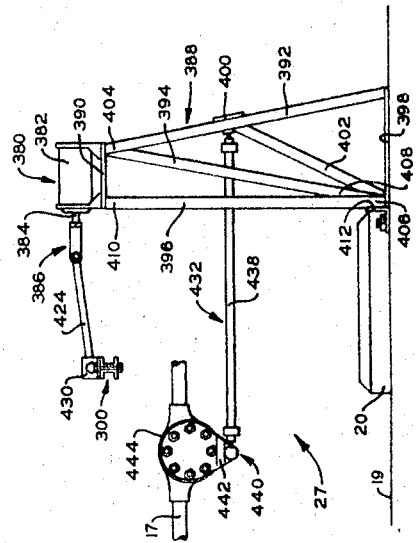
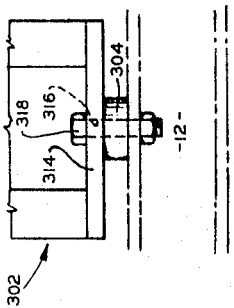
INVENTOR.
JAMES W. HOLZMAN
ATTORNEYS

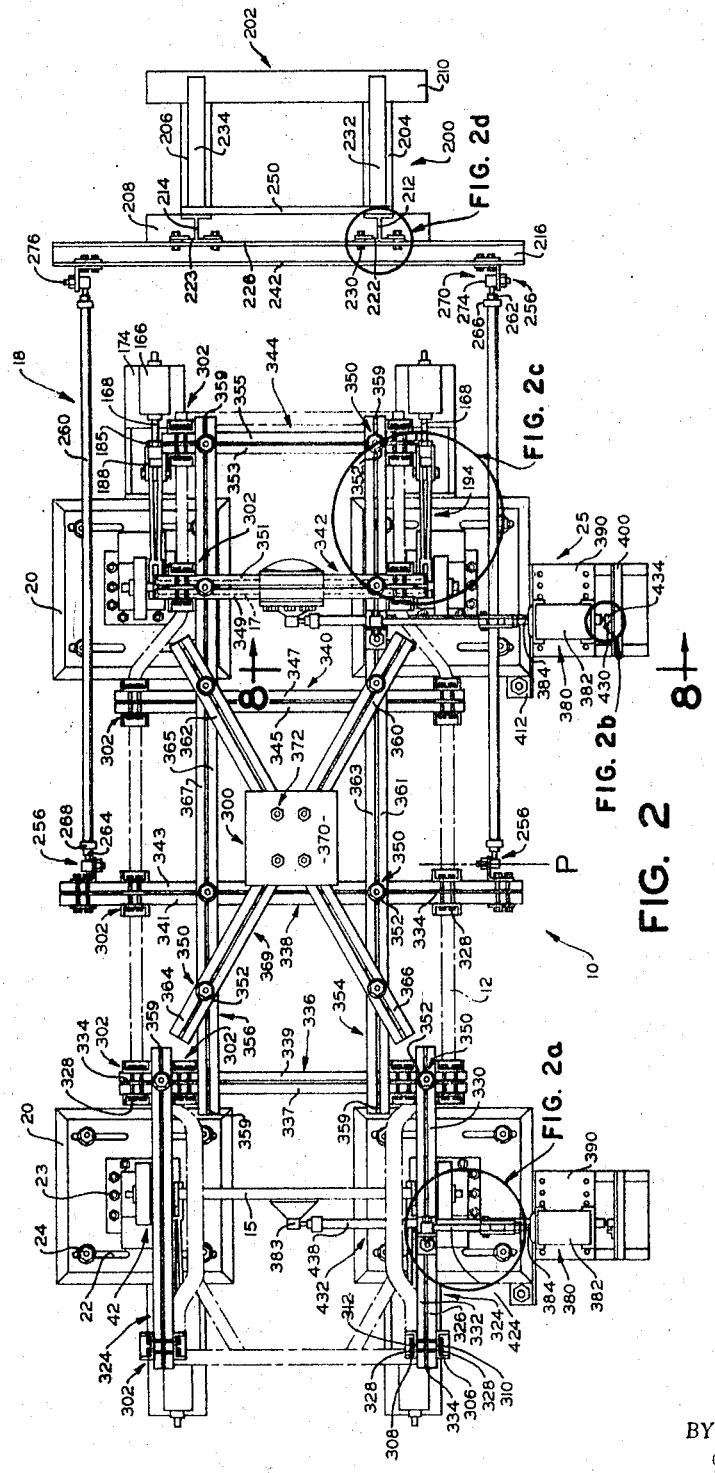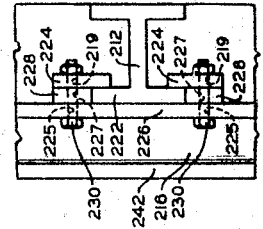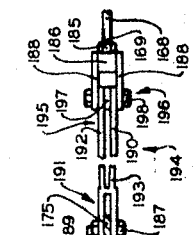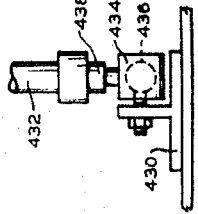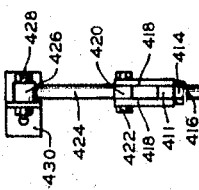

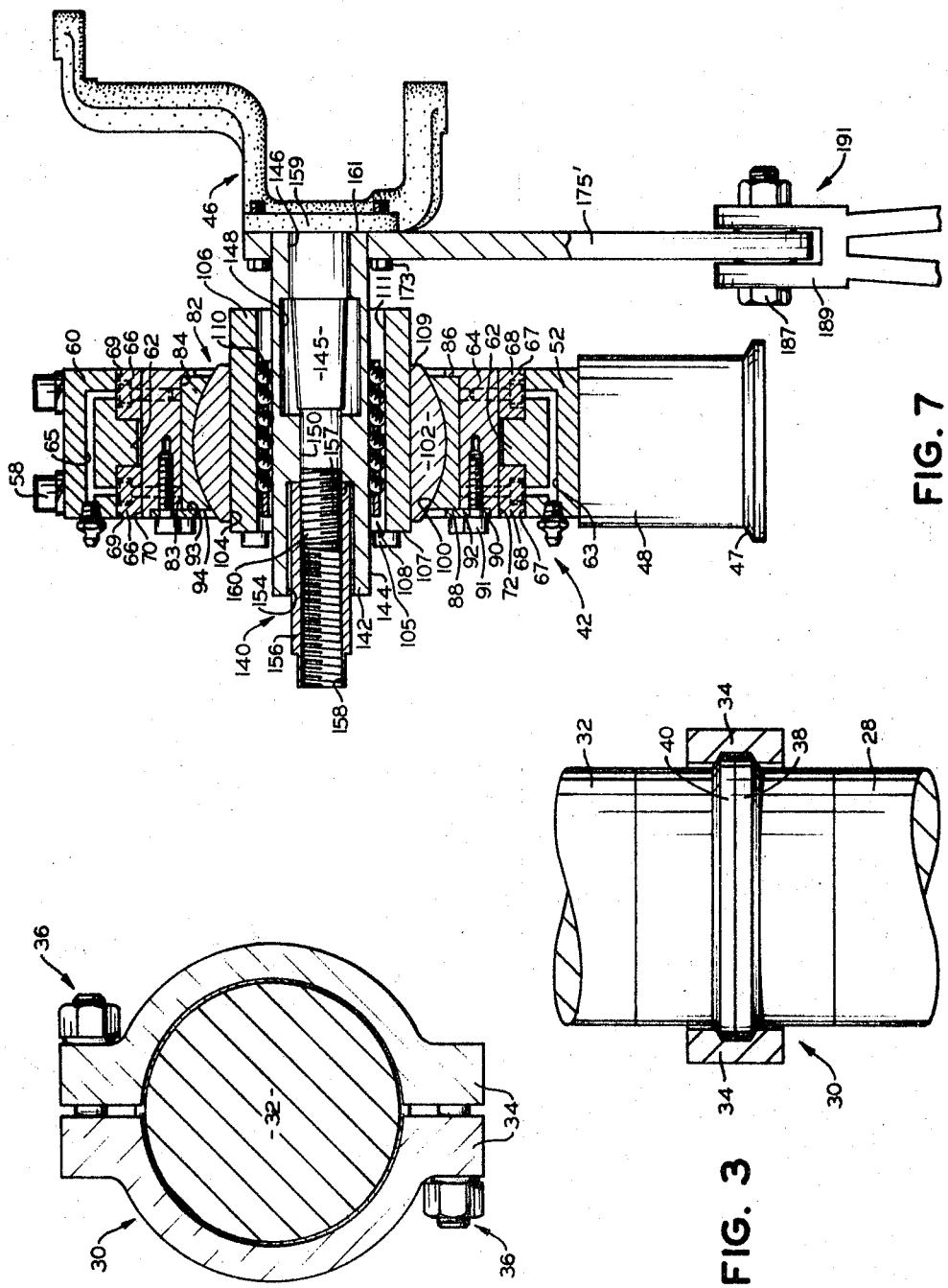

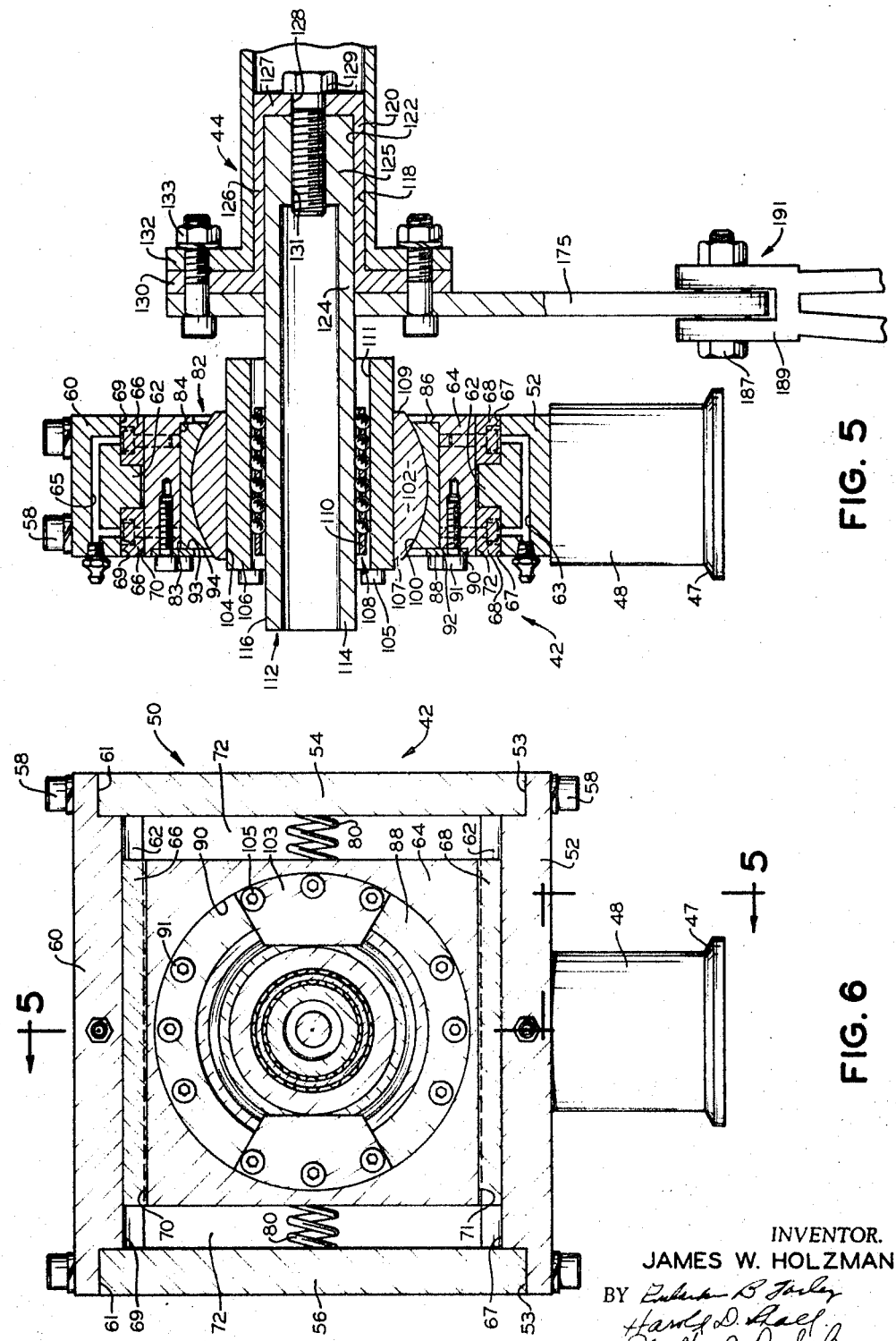

3,459,037
DYNAMIC ROAD SIMULATOR
James W. Holzman, Grosse Ile, Mich., assignor to Dana
 Corporation, Toledo, Ohio, a corporation of Virginia
Filed Nov. 14, 1966, Ser. No. 594,072
Int. Cl. G01n 29/00
U.S. Cl. 73—71.7                                17 Claims

ABSTRACT OF THE DISCLOSURE

A vehicular test frame apparatus is provided which closely simulates loading imparted by actual driving conditions. This testing apparatus applies vertical, torsional and inertia loading to the frame under test in a closely controlled manner so as to actually simulate the load which would be applied to a vehicular frame traversing a particularized road having known surface characteristics such as curvature, rise and fall and bumps.

---

This invention relates generally to a testing machine and more particularly to a dynamic testing machine in which a vehicle frame can be subjected to load conditions substantially the same at those encountered by a vehicle traversing over roads, highways and the like.

Dynamic load testing machines for vehicles have been utilized for many years in an attempt to simulate the actual loading encountered by these same vehicles in operation. The loads imparted to a vehicle during actual operation, particularly the loads applied to a vehicular frame, may be characterized as loading due to the "hop" phenomenon, the "tramp" phenomenon, torsional loading, cornering loading, loading due to resistance to skid, and loading due to inertia forces. The "hop" phenomenon describes the type of load imposed on a vehicular frame when the wheel of a vehicle drops into a hole. The "tramp" phenomenon describes the type of loading which occurs when a vehicle crosses over a washboard type surface. Both of these loadings impose severe stress on a vehicle frame, with the second, or "tramp" loading imposing the most severe stress since the forces produced are out of phase with the balance of the suspension system and thereby imposes severe vibration to the frame.

The torsional forces are imposed when braking or acceleration loads are applied to a wheel or wheels of the vehicle or when a wheel rolls over a bump, or the like. Cornering forces are those imposed on a vehicle when the vehicle negotiates a turn or bend in the road, these centrifugal forces tending to make the vehicle roll outwardly or skid during the turning movement. Loading is also imparted to the frame through the axles, during turning, by frictional resistance of the tires to skidding. Inertia forces are applied to the frame upon rapid acceleration or deceleration due to the heavy mass of the various vehicle parts. These last four forces are also of large magnitude, and, since the combination of all six forces exist during actual operation of the vehicle, a testing machine which would closely simulate the foregoing loads would be very useful in the development of new vehicle frames.

The stresses due to actual driving conditions could then be imparted to actual frames in a quick and expeditious manner under carefully controlled conditions thereby eliminating the time required for mounting the frame to be tested in the vehicle and driving it over a test track. By this method any inherent structural weaknesses in the frame could be easily observed, quickly discovered and the frame redesigned, if necessary, before the actual, final design of the vehicle had been accomplished and large sums of money expended.

Prior testing machines have been developed which impart to a vehicle frame a substantial number of the above enumerated loads but heretofore no testing machine has been developed which fully simulates hop, tramp, and torsional loading at all four wheels, and applies these simulated loads to the frame at the point where the actual loads would occur, and, at the same time, provides corner loading, skid loading, and inertia loading to the vehicle frame at substantially those points through which these forces act.

It is, therefore, an object of the present invention to provide a testing machine which closely simulates loading imparted by actual driving conditions.

It is a further object of this invention to provide a testing machine which applies vertical, torsional, cornering, and inertia loading to the device under test.

It is an additional object of the invention to provide a testing machine having an improved fixture for permitting the transfer of all the generated vertical, inertia, and torsional loading to a vehicle frame.

It is a still further object of this invention to provide an improved fixture that provides for linear motion of an element in two directions substantially transverse from each other and that also provides for universal rotary motion of the said element.

It is another object of this invention to provide a body simulating means which compensates for the actual vehicle body weight and properly loads the vehicle frame under test.

Further objects and advantages will become apparent upon reading the following specification together with the accompanying drawings which form a part thereof.

In accordance with the objects of the invention, the dynamic testing machine forming the subject matter of this invention, has mounted thereon a vehicular frame, including its front and rear axles and frame axle mounting means. The axles are supported by a vertically reciprocating "hop" and "tramp" simulating means which includes a series of four vertical reciprocating elements situated proximate the wheel locations of the vehicle frame. Each of these reciprocating elements is attached to the vehicular axis through a fixture capable of universal rotary motion, transverse and longitudinal sliding motion so that the axle ends are free to movingly deflect upon vertical, torque, cornering, or inertia loads being placed on the vehicular frame. Mounted inboard of the reciprocating means and directly attached to each of the axles near its ends is a longitudinally reciprocating torsional load applying means. An acceleration and deceleration inertia simulating means is also provided and is attached to the vehicular frame at its longitudinal pitch axis and a body simulating means is mounted on the vehicle frame to properly preload the frame. Cornering or centrifugal loads are imposed on the vehicle frame through a connection of such a simulating means with the body simulating means and a non-skid simulating means is provided in opposition to this imposed centrifugal force.

A better understanding of the invention can be had by reference to the drawings which form a portion of the specifications and wherein;

FIG. 1 is a view in elevation of the dynamic testing machine with the corner loading simulating means removed and attached frame in the position of test;

FIGURE 1a is an enlarged showing of that portion of the structure of FIGURE 1 which is encompassed by a full-lined circle;

FIGURE 1b is an enlarged showing of that portion of the structure of FIGURE 1 that is encompassed by a dash-lined circle;

FIG. 2 is a plan view of the structure shown in FIG. 1 with the corner loading simulating means added and taken generally on line 2—2 of FIG. 1;

FIGURE 2a is an enlarged showing of that portion of the structure shown in FIGURE 2 which is indicated 2a;

FIGURE 2b is an enlarged showing of that portion of the structure shown in FIGURE 2 which is indicated 2b;

FIGURE 2c is an enlarged showing of that portion of the structure shown in FIGURE 2 which is indicated 2c;

FIGURE 2d is an enlarged showing of that portion of the structure shown in FIGURE 2 which is indicated 2d;

FIG. 3 is a fragmentary view in elevation with some of the parts shown in cross-section of the connection of the spacer member and vertical actuating means;

FIG. 4 is a plan view of the connecter assembly;

FIG. 5 is a view in cross-section taken on line 5—5 of FIG. 6 and showing the connection of the rear axle to one of the fixtures forming a part of this invention;

FIG. 6 is an elevational view of one of the fixtures forming a part of this invention;

FIG. 7 is a view in elevational cross-section of the connection of the front axle to one of the fixtures forming a portion of this invention; and FIG. 8 is a fragmentary view of the corner loading mechanism taken substantially on line 8—8 of FIG. 2.

Referring now more particularly to FIGS. 1 and 2, a testing machine assembly 10 having a vehicle frame 12 mounted thereon is arranged so that the testing machine supports the entire static weight of the frame 12 on a vertical reciprocating means 14, simulating the "hop" and "tramp" phenomenon of a moving vehicle. A torsion applying means 16 is attached to the front and rear axles 15 and 17 respectively, and an acceleration and deceleration inertia simulating means 18 is attached to the vertically supported frame 12 to thereby provide a reacting force against torsion application. A corner simulating means 25 is attached to a frame formed of adjustably joined structural members, the said frame serving as a body simulating assembly 300. The testing machine assembly 10 is completed by a non-skid simulating means 27 attached to the axles 15 and 17 to serve as a reactive force against vehicle frame cornering.

Provision is made for adjustably securing the reciprocating means 14 to a floor 19 of a laboratory test room or the like so as to dampen any vibrations imparted thereto and to provide for a variety of frame sizes. This is accomplished by the use of four generally square base members 20, each having a series of transversely extending slots 22 therein into which nut and bolt assemblies 24 are inserted to securely hold each of the bases 20 to the floor, thereby providing transverse adjustability so that vehicles of various tread widths may be accommodated. Each of the slots 22 overlies a slot (not shown) which is disposed in the floor 19, the said slot extending transversely to a slot 22 so that each of the bases 20 may be adjusted for frames of various lengths, these last mentioned slots also mounting the nut and bolt assemblies 24.

Extending upwardly from the base 20 and attached thereto by bolts 23 is a vertically reciprocating assembly 21, comprising a hydraulic cylinder 26 of generally cylindrical shape having a piston 28 of similar shape arranged to reciprocate therein. A connecter assembly 30 fixes the piston 28 to a spacer member 32, also of generally cylindrical shape, which may be selected from a variety of lengths to obtain the desired test height for the vehicular frame 12. The connecter assembly 30 comprises a pair of split rings 34, 34 (FIGS. 3 and 4) having a generally internal, inverted trough-shape so that as the rings 34, 34 are bolted together by bolt assemblies 36 a pair of enlarged beveled ends 38 and 40 of the respective piston 28 and spacer member 32 are urged into tight abutting engagement. It should be noted that the dimensions of the "trough" in the split rings 34, 34 are designed in such a manner that, in engaged position, no bottoming occurs between the split rings and the beveled ends 38 and 40 so that the connected split rings, at all times, urge the piston and spacer member into abutting engagement.

Attached immediately above the spacer member 32 is a fixture 42 providing for universal rotary and transverse and longitudinal sliding movement of the rear and front axle ends 44 and 46, respectively. The fixture 42 is attached to the upper ends of the spacer member 32 by a connecter assembly including a pair of split rings 34, 34 in a manner similar to the connection formed between the piston 28 and spacer member 32 through an enlarged beveled end portion 47 (FIG. 5) on a column member 48 of generally circular cross-section that is affixed to and forms the lower portion of the fixture 42.

The fixture 42 can best be seen in FIGS. 5–7 and includes immediately above and fixed to the column member 48, a four-sided, generally square frame 50. Frame 50 is fixed to the column member 48 by any conventional attaching means between it and a spacer member 52 forming the bottom side of the frame 50. Side members 54, 56 of frame 50, having a generally square cross-section, are disposed in right angle notches 53, 53 in spacer member 52 and extend upwardly therefrom. The side members 54 and 56 are attached to the spacer member 52 by cap screws 58, 58 to form a rigid connection therebetween. At its top, frame 50 is closed by a top member 60 that is also attached to the side members 54, 56 by cap screws 58, 58 with the side members also disposed in right angle notches 61, 61 in the top member 60. Because of this construction, frame 50 provides an extremely rigid assembly having a continuous and smooth outer surface of generally square shape, the frame 50 furnishing support for all the relatively moving elements included in the fixture 42.

A key 62 is formed on the inner surfaces of both the spacer member 52 and top member 60, with the key 62 on each of these elements extending substantially along their entire lengths. Lubrication channels 63 and 65 are also formed in a lower spacer member 52 and top member 60, respectively, to provide passage for the lubrication of a pair of bearing surfaces 67 and 69 formed on opposite sides of each of the keys 62.

Mounted within the frame 50 for limited, longitudinal sliding movement is a spacer block 64 having a general square shape in elevational view. The spacer block 64 includes bearing members 66, 66 and 68, 68 attached to its upper and lower sides 70 and 71, respectively, by countersunk cap screws 73 with space forming a keyway provided between each of the members 66, 66 and 68, 68 for projection therein of the key 62 so that bearing surfaces 75, 77, respectively, ride on opposed bearing surfaces 67 and 69 on spacer member 52.

Sufficient clearance is provided between the keyway surfaces 78, 78 and upper and lower sides 70, 71 of the spacer block 64 adjacent thereto to insure that all bearing loads are carried by the bearing members 66, 66 and 68, 68 with the key 62, 62 providing only guidance for parallel sliding motion of the block 64. The spacer block 64 is dimensioned so that its width is less than the interior width between the side members 54 and 56 so that clearance 72, 72 between it and these side elements is provided. With the arrangement just described, the spacer block 64, and thereby the other later to be described movable elements of the fixture 42, have limited longitudinal guided sliding movement relative to the vertical reciprocating means 21. If desired, a pair of centering and anti-bottoming springs 80, 80 may be mounted to the frame 50 and spacer block 64 in the clearances 72, 72 by any conventional means to center and to prevent abutment between the spacer block and its supporting frame.

A spherical bearing member 82, having a generally cylindrical outer surface 83, is press fitted into a central, circular bore 84 in the spacer block 64 so as to limit relative movement therebetween. Additionally, this bearing member abuts rightwardly against a shoulder 86 formed in the spacer block 64 (FIG. 5) to limit further inward movement of the bearing member in the bore 84. Leftward movement of the bearing member 82 is prevented by a retaining ring 88 inserted in the spacer block 64 in a counterbore 90 formed therein, the counterbore having limited axial extent. Retaining ring 88 abuts against a shoulder 92 in the spacer block formed by the rightward termination of the bore 90 and is fixed in such position by a series of screws 91 fastened to the spacer block 64. The internal diameter of the retaining ring 88 is of smaller dimension than the diameter of the bore 84 so that a face 93 thereof abuts against the leftward end 94 of the spherical bearing member 82 to limit leftward movement thereof. The structure just described provides a unitary assembly of the spherical bearing member 82 and spacer block 64 to prevent relative rotational or translation movement therebetween so that these members act as a unitary assembly.

The bearing member 82 includes a spherical bearing seat 100 formed on its internal periphery, the seat having a radius of curvature which is the same as the radius of curvature of a uniball member 102, having a truncated spherical shape and mounted therein so that the uniball member may move rotationally and angularly relative to the bearing seat, and thereby relative to the frame 50. The uniball member 102 is prevented from assuming too great an angular relationship relative to the remainder of the fixture 42 by the use of a pair of guard members 103 that overlap a portion of the uniball member, the said guard members 103 being mounted in opposed confronting relation on the retaining ring 88 by bolts 105, extending through the retaining ring 88 and into the spacer block 64. The guard members 103 are offset slightly from the outer side of the uniball member 102 to permit limited angular movement of the uniball member 102.

A longitudinally extending bore 104, disposed centrally relative to the generating sphere of the uniball member 102, carries an outer race member 106 that is press fitted therein so as to remain fixed relative to the ball. The outer race 106 extends laterally beyond the end faces 107, 109 of the uniball member and has a longitudinally extending bore 108 with the internal circumferential periphery of the bore forming an outer race 111. A linear bearing 110, disposed in the race in slight preloaded condition, provides relative sliding and rotational movement between the outer race member 106 and a bearing adapter means 112 attached to the axle assembly. It should be noted that rotational movement of the uniball 102 is also possible, but, because of the smaller mass of the bearing adapter means, normally, rotational movement occurs at the bearing 110.

Both the front and rear axle fixtures at each axle end, as so far described, are in all respects similar, however, because of the dissimilarity of the rear and front axle ends 44, 46 the aforementioned bearing adapter means that connects the fixture 42 and the adjacent axle end must be modified so as to provide a positive connection therebetween. A typical rear axle connection is seen in FIG. 5 and a typical front axle connection is seen in FIG. 7.

The bearing adapter means 112, for the rear axle end 44, includes a linear bearing sleeve 114 of generally hollow cylindrical shape and having an outer diameter of sufficient size so that the outer circumferential periphery thereof forms an inner race surface 116 for the linear bearing 110. The sleeve 114 can, thus, easily reciprocate and rotate relative to the outer race member 106, and thereby, relative to the frame 50. As shown, sleeve 114 is elongated so as to extend rightwardly beyond the fixture 42 and into a bore 118 formed in the axle end 44, sleeve 114 always being provided with sufficient length so that the fixture 42 is spacedly displaced laterally from the axle end 44 so that there is no interference between them. Also disposed within the bore 118 of the axle end 44 is a cylindrical retaining member 120 having a bore 122 that receives a rightwardly extending end 124 of the sleeve 114 in telescoping relation. The end 124 on the sleeve includes a cap portion 125 and an end portion 126 on the retaining member includes a cap 127, each having a bolt receiving aperture therethrough, with the aperture 128 in the retaining member being unthreaded and the aperture 131 in the sleeve being threaded so that a threaded bolt 129, inserted in the apertures, fixedly connects the sleeve and retaining member together.

The retaining member 120 also includes a circular flange 130 at its leftward end which is bolted to wheel retaining flange 132 on the axle end 44 by nut and bolt assemblies 133 so that the axle retaining member and sleeve serve as an integral unit and any angular, lateral or longitudinal displacement of the axle end 44 relative to the fixture 42, is accommodated by the above related moveable elements of the fixture, without transmission of the heavy loads which would be imparted by these displacements being transferred to the vertical reciprocating means 14.

The bearing adapter means 140 for the front axle end 46, as shown in FIG. 7, includes a linear bearing sleeve 142 of generally cylindrical hollow shape and having an outside diameter of sufficient size so that the outside periphery thereof forms an inner bearing race 144 for the linear bearing 110. Thus, sleeve 142 can easily reciprocate and rotate relative the outer race member 106. The bearing sleeve 142 includes a series of connected bores 146, 148, and 150, progressing leftwardly from its rightward end so that a typical front wheel spindle shaft 145 may be nestingly inserted therein. A bore 154, at the leftward end of the bearing sleeve 142, connects with the bore 150 and is sized so as to provide for the insertion of an extension nut 156. The nut 156 includes internal threads 158 that mate with external threads 160 existing on the wheel spindle so that the wheel spindle and bearing sleeve may be fixed relative to each other by tightening the extension nut 156 against a face 157 at the termination of the bore 154 and thereby jamming a flanged portion 159 on the spindle shaft against the end face 161 of the bearing sleeve. Movement of the spindle end 46 of the axle is then transmitted directly through the bearing sleeve 142 and accommodated by the various moving elements of the fixture 42.

The torsion applying means 16, which simulates braking and acceleration loading on the vehicular frame 12, is also connected to the front or rear axles proximate the axle ends 44 and 46. More specifically, adjacent each of the axle ends and substantially linearly aligned therewith is a longitudinal reciprocating means 164, shown generally in FIG. 1, comprising a hydraulic cylinder 166 and piston 168, with the piston 168 driving a load applying linkage means 170.

Each of the longitudinal reciprocating means 164 is supported in fixed relation relative to the frame 12 by a table structure 172, the reciprocating means 164 being fixed to a table top 174 thereof by any conventional means (not shown). The table top 174, in turn, is supported by a series of struts, which at one side of the table structure 172 comprise, for example, upright struts 176, 178, and 180, and horizontal strut 182. Vertical struts 176 and 178 are angled inwardly and upwardly towards each other relative to the vertical with their top portions joined to form an apex 179 that is joined to the table top while strut 180 extends substantially vertically with its lower end 181 connected to the lower end 177 of the strut 178 and its upper end 183 connected to the table top 174. Horizontal strut 182 forms the base for the struts 176, 178, and 180 is vertically aligned and attached to the lower ends of each of these vertically extending struts.

Advantageously, each of these struts is formed from U-shaped channel members with the adjoining ends of the channel members and table top 174 being attached to each other by welding or the like. The opposite side of the top portion of the table structure 172 (not shown) is also supported by a strut structure exactly similar to the one described with sufficient cross bracing therebetween to add rigidity to the assembly. A rib 184 is attached to the base member 20 and extends transversely relative to the piston 168 for attachment to the horizontal strut 182 and the angularly extending strut 176 on each side of the assembly to form the front base member for the table structure and the attachment of the table structure to the base member 20 so that adjustment of the base member transversely or longitudinally causes a like adjustment of the vertical reciprocating means 164 in a similar manner.

The load applying linkage 170 is attached to the piston 168 by means of a block 186 having a threaded nut 185 welded thereto which, in turn, is threaded on the piston end 169. Extending toward the axle end 44 or 46 from the block 186 and affixed to the sides of the block 186 are a pair of links 188 that are directly driven by the piston 168 and move with the same horizontal reciprocating motion. The links 188 are disposed on the outer sides of a pair of upstanding flanges 190 and 192 on a connecting link 194 having a generally U-shaped cross section and are pivotally connected thereto by a pivot means 196.

The pivot means 196 includes a hollow cylindrical member 197 disposed between the flanges 190 and 192 and dimensioned so as to impinge on the insides of these flanges and space the flanges 190 and 192 horizontally from each other. A nut and bolt assembly 198 passes through the links 188, flanges 190 and 192, and the cylindrical member 197 to provide a bearing means for pivoting motion. The connecting link 194 is provided with an enlarged portion 195 adjacent the pivot means 196 to space the flanges 190 and 192 properly for connection to the links 188 and to thereby form a yoke to accommodate the cylindrical mmeber 197.

As the connecting link 194 extends towards the axle end, it is narrowed in width by a necked portion 193 which merges into a conventional U-shaped channel portion 191 that forms the major linear extent of the connecting link 194. The portion 191 of the connecting link extends towards the axle end and terminates at an end portion 189 that is spatially displaced vertically beneath the axle end 44 or 46 and vertically below the level of the fixture 42 (FIGS. 5 and 7). The end portion 189 of the connecting link mounts a pivot bolt and nut assembly 187 which, in turn, is connected to a vertically extending link 175 or 175′ fixed to rear or forward axle end 44 or 46, respectively.

The rear axle connection and the vertically extending link 175 can be seen in FIG. 5, with the link extending upwardly to the axle end 44 so as to provide easy connection to the wheel retaining flange 132 by the nut and bolt assemblies 133. The front axle connection for the vertically extending link 175′ is shown in FIG. 7, and is provided by bolt and nut assemblies 173 attached to the flanged portion 159 of the front wheel spindle shaft 145.

The length of the links 175 and 175′ are selected, dependent on the length of the variable length spacer member 32, to maintain the connecting link 194 in a generally horizontally extending position and the links 175 and 175′ vertical when the piston 168 is at its neutral position, that is, when the piston is disposed at about the midpoint of its stroke so that an equal torsional loading in both a clockwise and counterclockwise direction may be applied.

The inertia simulating means 18, referring to FIGS. 1 and 2, is disposed adjacent to and behind the vehicular frame 12 by being attached to a supporting fram 200 that is fixed to the test floor 19 by any conventional means. The frame 200 includes a substantially square base 202 formed by interlocking I-beam members 204, 206, 208, and 210, with the longitudinally extending I-beams 204 and 206 extending between the I-beams 208 and 210, forming the transverse elements of the base 202. The flanges of the longitudinally extending I-beams 204, 206 are received between the flanges on the transverse I-beams 208 and 210 and the I-beams are then rigidly connected together by any suitable means such as welding or the like. Extending upwardly from the transversely extending I-beam 208 and fixed thereto also by any conventional means are a pair of transversely spaced I-beams 212, 214 which are disposed in vertical alignment with the longitudinal beams 204 and 206, respectively.

A U-shaped channel member 250 is attached to the rearward side of the beams 212 and 214 and extends therebetween to provide structural rigidity to the frame 200 and prevent twisting of one of the upper ends of these beams relative to the other. Extending angularly downwardly and attached to channel member 250 are a pair of I-beams 232, 234. All these I-beams have their abutting end portions attached by welding or the like to form a rigid supporting structure able to withstand high loading with a minimum of deflection. It should be noted the I-beams 232, 234 are also aligned vertically with the longitudinal I-beams 204, 206 and that the angularly extending beams 232, 234 prevent horizontal deflection of the upper ends of the beams 212, 214. From the foregoing description it can be seen that an extremely rigid supporting frame has been provided, however, it should be understood that other structural arrangements could be utilized to support the inertia simulating means 18 as long as such support provided the essential rigidity to withstand the loading involved.

Means are provided to adjustably mount the inertia simulating means 18 relative to the frame 12 which means comprises a cross I-beam 216 mounted on upper portion 213, 213 of the I-beams 212 and 214. Each of these latter beams has disposed adjacent the inside of its leftward flange 222, 223, respectively, a pair of flat platelike members 224, 224. Bolt and nut assemblies 230 extend through apertures 219 in each of the plates 224 and through apertures 225 in the adjacent flange 226 of the I-beam 216 and aperture 227 in a pair of plate-like members 228 so that the I-beam 216 may be adjusted vertically and the bolt assemblies 230 tightened to wedge the plate-like members 224 against the flanges of the beams 212 and 214.

The inertia simulating means 18 is also provided with transverse horizontal or width adjustment by plates 238, 240 mounted on the forward end of flanges 242 of cross I-beam 216, each of the plates having vertically aligned apertures 248, 248 and 249, 249 which are centered with apertures 252, 252, 254 and 254 on right angle shaped member 256 disposed on the opposite side of the flange 242 of I-beam 216. Elongated horizontal extending spacer plates 241 disposed above and below the flange 242 provide for alignment of the plate 238 or 240 and angle member 256 in a transverse direction. Nut and bolt assemblies 258 secure each of the angled members 256, spacer plate 241, and plates 238, 240 at the desired location.

The inertia simulating means comprises, on each side of frame 12, a long pipe-like link 260 having oppositely threaded end portions 262, 246. Threaded colors 266 and 268 are attached to each of the threaded portions so that the effective length of the link may be adjusted by rotating it clockwise or counterclockwise in or out of collars 266 and 268.

Fixed to the rightward end of collar 266 is a strut connecter element 270 having a spherical knuckle end portion 272. End portion 272 mates with a spherical bearing seat 274 of similar configuration so that the links 260 are capable of angular movement. The bearing seat member 274, in turn, is pivotally mounted on extending pin 276 which passes through a longitudinally extending arm 257 of angle member 256 and is fixed thereto so that the bearing seat 274 and link 260 may rotate on a transverse horizontal axis and also move angularly in its bearing seat member 274. The links 260, thus, are capable of angular and pivotal movement at this end of each of the links.

At the leftward end of the links 260, the links are also pivotally and angularly mounted by means of a spherical knuckle end portion 272 that mates with a bearing seat member 274 pivoted at pin 276 to an angle member 256 that is attached by any convenient means to the vehicle frame. The pivot pin 276 connected to the vehicle frame is located at the longitudinal pitch axis P of the frame so that oscillation provided by the vertical and horizontal reciprocating means 14 and 16 is not dampened out by the inertia simulating means 18.

In order for a test on the frame 12 to fully simulate the conditions encountered during driving, the frame must be loaded with weights or the like to provide for the loading on the frame due to the body of the vehicle, the engine and other internal components of the vehicle such as the seats, etc. Alternately, a fully fabricated vehicle could be placed on the testing machine 10 to test the structural components of the frame. The first mentioned method is considered more advantageous since the vehicle frame is not obscured by the body, etc., and can then be more closely observed under test and, further, the testing can occur earlier in the development stage of a particular vehicular model.

A body simulating assembly which may be used with the present test machine is indicated generally at 300 in FIGS. 1 and 2. The assembly 300 comprises a series of longitudinal and transversely extending beam subassemblies mounted on a series of upright column subassemblies so that length, width, height, and torsional rigidity of the body simulating assembly 300 can be easily adjusted to fit a variety of frames.

More specifically, the assembly 300 includes a series of upwardly extending column subassemblies 302 mounted on a series of rubberized body mounting members 304 which are provided affixed to the frame for the normal mounting of an actual car body. The column subassemblies 302 can be seen in plan view in FIG. 2, and, in front and side view in FIG. 1 (the rightward column subassemblies 302 and the most leftward column subassembly 302, respectively). Each column subassembly comprises a pair of upwardly extending, spaced, U-shaped channel members 306, 308 with the webs 310, 312 of the channel members, respectively, disposed so that the channel members are oppositely facing. Positioned at the bottom of each subassembly 302 is a plate 314 welded to the bottom portions of the channel members, the plate having an aperture 316 disposed therein for reception of a bolt 318 that connects the column subassembly to one of the body mounting members 304. Each of the channel members includes a series of pairs of vertically extending slots 320 and 322 that provide height adjustment for a series of beam subassemblies mounted thereon.

One of the beam subassemblies, longitudinally extending beam subassembly 324, is mounted at each side adjacent the front of the frame 12 and extends longitudinally therewith and has its forward portion 326 mounted between the channel members 306, 308 of the most leftward column subassembly 302 by means of nut and bolt assemblies 328 extending through slots 320 and 322 above and below the oppositely disposed U-shaped channel members 330, 332 of the beam subassembly 324. A flat shim plate 334 spaces these channel members transversely and is of sufficient vertical height to extend above and below the channel members 330, 332 to receive the bolt assemblies 328 therethrough. By this mounting arrangement, beam subassembly 324 at its leftward end may be easily adjusted vertically merely by loosening the bolt assemblies 328 and moving the subassembly 324 upwardly or downwardly relative to the slots 320 and 322. The column subassembly 302 is also adjustable longitudinally by sliding the shim plate 334 and column subassembly 302 relative to the U-shaped channels 330 and 332 to accommodate other locations of body mounting member 304 furnished on differing test frames 12.

Transverse beam subassemblies 336, 338, 340, 342, and 344 are fabricated from a similar number of structural members as beam subassembly 324 and adjustably mounted at each of their ends by column subassemblies 302 connected to body mounting members on the frame 12. Transverse beam subassembly 336, as illustrated, is provided with a pair of column subassemblies 302 at each of its ends, since the particular frame under test had a pair of body mounting members 304 in this area of the frame, while transverse beam assemblies 338, 340, 342, and 344 are each mounted on a single column subassembly 302 at their respective ends. Thus, each of the transverse beam subassemblies comprises a pair of oppositely U-shaped channels spaced by shim plates adjacent their ends and connected together with bolt assemblies so that each is capable of adjusting vertically and the column subassemblies 302 which mount them transversely to adapt to differently located body mounting members 304. Specifically, the beam assemblies 336, 338, 340, 342, and 344 are comprised of a pair of oppositely facing U-shaped channel members 337 and 339, 341 and 343, 345 and 347, 349 and 351, 353 and 355, respectively, spaced by shim plates 334 and connected by bolt assemblies 328.

The rightward end 348 of the longitudinal extending beam subassembly 324 is attached to the transverse beam subassembly 336 by the use of a bolt and nut assembly 350 having reinforcing plates 352, 352 which bearingly impinge on the upper flanges of the longitudinal beam subassembly 324 and the lower flanges of the transverse beam subassembly 336 when in tightened condition. Clearance for passage of a bolt 357 of the bolt and nut assembly 350 through the beam subassemblies is provided by the spacing between their oppositely facing U-shaped channels. The above described mounting permits the rightward end of the longitudinal beam subassembly 324 to be adjusted transversely relative to the transverse beam subassembly 336. The rightward end of the longitudinal beam subassembly 324 is provided with a spacing plate 359 which spacedly displaces the ends of its U-shaped channel members.

Longitudinal beam subassemblies 354 and 356 are constructed in a manner similar to the longitudinal beam subassembly 324 and are also provided with spacing plates 359 near their ends to provide a center clearance between the oppositely facing U-shaped channels 361, 363, 365 and 367, respectively. The longitudinal beam subassemblies 354, 356 are also attached by a series of nut and bolt assemblies 350 and reinforcing plates 352, 352 to the transverse beam assemblies 336, 338, 340, 342 and 344 with the longitudinal beam assemblies passing over the transverse beam subassemblies 336, 338, 342 and 344 and under the transverse beam subassembly 342. With this arrangement, the longitudinal beams subassemblies can be adjusted for various widths of frames and the transverse beam subassemblies longitudinally to provide for various locations of body mounting members 304.

Mounted above and attached to the longitudinal beam subassemblies 354, 356 is an adjustable cross frame 369 which provides the desired torsional rigidity to the body simulating means 300. A series of four angularly disposed beam subassemblies 360, 362, 364 and 366 fabricated in the manner previously set out (a pair of oppositely facing U-shaped members separated by attached spacing plates) are disposed in a generally X shaped configuration. Each of beam subassemblies at its outer end is attached to one of the longitudinal beam assemblies 354, 356 by a series of nut and bolt assemblies 350 and reinforcing plates 352. At the converging inner ends of the beam subassemblies a structural plate 370 adjustably mounts each of the beam subassemblies by a series of nut and bolt subassemblies 372 and reinforcing plates 352 (not shown) disposed on the bottom flanges of the angularly disposed beam subassemblies. Thus, the X-frame formed can be made to expand or contract to place the connection of the angularly disposed beam subassemblies at any desired location along the longitudinal beam subassemblies 354, 356, providing greater or lesser torsional strength to the body simulating means 300.

Additional weights or some of the larger actual parts such as the motor of the vehicle are then mounted on the body simulating frame means 300, convenient attachment being made through the space provided by the oppositely disposed U-shaped members forming the frame so as to compensate for the weight of the rest of the vehicle.

The cornering simulating means 25, which provides a force to the frame 12 that is the equivalent of the centrifugal force applied to the frame of a car during turning, is connected to the body simulating assembly 300 proximate the rear axle at 381 and to a front suspension area shown generally at 383. More specifically, located on one side of the frame 12 are a pair of transversely reciprocating means 380 comprising a fluid cylinder 382 and piston 384, with the piston driving a load applying linkage means 386.

Each of transversely reciprocating means 380 is supported in fixed relation relative to the frame 12 by a table structure 388 (FIG. 8), the reciprocating means 380 being fixed to a table top 390 thereof by any conventional means (not shown). The table top 390, in turn, is supported by a series of struts connected thereto, which, at each side of the table structure comprise, for example, upright struts 392, 394, 396 and 402. Vertical struts 392 and 394 are angled inwardly and upwardly toward each other relative to the vertical with their top portions joined to form an apex 404 that is also joined to the table top, while the strut 396 extends substantially vertically with its lower end 406 connected to a lower end 408 of the strut 394 and with its upper end 410 connected to the table top 390. A horizontally extending bottom plate 398 of substantial thickness is connected to and mounts the upright struts 392, 394, 396 and 402 to provide a stable base for the table structure 388.

Strut 402 extends upwardly from the base in an angled relation relative thereto and is connected to a T-shaped across member 400 that extends between opposed struts 392 on opposite sides of the table structure 388 to add rigidity to the entire frame of the table structure. Attached slightly above the bottom plate 398, at the inward sides of the struts 396, is a stringer member 412 that is secured thereto and to the base member 20 adjacent the table structure 388 so that the table structure 388 moves with the base member 20 as it is adjusted.

The load applying linkage 386 for the cornering simulating means 25 is attached to the piston 384 in a manner somewhat similar to the load applying linkage 170. More specifically, a block 411 (FIGS. 2 and 8) is provided having a threaded nut 414 welded thereto that is screwingly attached to the piston end 416. Extending toward the body simulating assembly 300 from the block 411 are a pair of links 418 which are affixed to the block 411 and directly driven by the piston 384 to move with it in its horizontal reciprocating motion. The links 418 are disposed on the outer sides of a journal block 420 fixedly connected to a thrust strut 424. Connection between the links 418 and the thrust strut 424 is made by means of a pivot bolt 422 that pivotally connects the links 418 to the block 420.

At its opposite end, the thrust link 424 is porvided with an enlarged end 426 that threadingly receives a bolt 428. The bolt 428, in turn, is connected to an upstanding generally T-shaped plate 430 adjustably affixed by a bolt or the like (not shown) to the body simulating assembly 300. The general structural dimensions of the T-shaped plate are arranged to place the bolt 428 at a height substantially in the horizontal plane of the center of gravity of the vehicle. Thus, each of the load applying linkages 386, through the transverse reciprocating means 380, provides a tipping force to the frame 12 that closely simulates the cornering forces encountered by a vehicle frame under road conditions.

As set out previously, in order to simulate the forces imposed on the frame 12 of the vehicle due to the frictional resistance of the tires to movement, a non-skid simulating means 27 is provided. Attached to the table structure 388 below the transverse reciprocating means 380 is a ball jointed rod 432. The ball jointed rod 432 comprises a spherical seat 434, fixedly attached to the T-shaped plate 430 of the table structure 388, the seat 434 mounting a spherical knuckle end portion 436 formed on the end of a thrust rod 438. The opposite end of the thrust rod 438 (at the rear axle location) is pivotally attached at 440 to a bracket 442 (FIG. 8) extending downwardly from the differential 444 of the rear axle 17.

In a similar manner, a ball jointed rod 432 is attached by a bracket to the differential or the like of the front axle 15. By this arrangement, thrust provided by the reciprocating means 380 in the simulation of centrifugal forces is opposed by the thrust rods 438, 438 and the forces from both simulating means 25 and 27 are imparted to frame 12.

The operation of the testing machine is now described. After the frame 12 has been mounted on the vertical reciprocating means 14 through the fixture 42 the pistons 28 are placed at about the midpoint in the travel and the torsion applying means 16 connected to the axle ends 44, 46 and adjusted so that the connecting link 194 is horizontal when the pistons 168 are at the midpoint of travel. The inertia applying means 16 is connected to the longitudinal pitch axis P of the vehicle and adjusted so that link 260 is horizontal. The corner loading simulating means 25 are attached to the vehicle frame 30 with the link 418 horizontal and the related pistons in the midpoint of their travel and the non-skid simulating means 27 attached to the axles with the thrust rods 438 horizontal.

Actuation of the vertical reciprocating means 14, horizontal torsion applying means 16, and corner load simulating means is then cyclically provided to simulate "hop," "tramp" acceleration deceleration and cornering and torque loading on the frame with the inertia simulating means 18 and non-skid simulating means providing a force opposing any braking, acceleration or cornering of the frame, thereby with the added downward weight of the frame, body simulating assembly 300 and attached weights, fully simulating all the loads imposed by road condition on the vehicle.

Although any desired cyclic loading may be applied, ideally, the actual loads imposed on a vehicle while driving over a test road specified by the vehicle manufacture such that the Belgian Block Road or one of the other well-known test roads is used. An actual vehicle is driven over one of these roads and the actual loading imparted thereto is recorded on magnetic tape. This tape is then utilized to control the testing machine assembly 10 by feeding it through an electric programmer and electro-hydraulically controlling the cycles of varied reciprocation of the various simulating means. In this manner the actual driving test conditions specified by a vehicle manufacturer may be extremely closely simulated and a vehicular frame closely analyzed both by visual and/or other test means.

The foregoing disclosure sets forth specifically a description of a preferred embodiment of the invention, however, other obvious mechanical or hydraulic equivalents for carrying out the objects of this invention will occur to one skilled in the art. The scope of the invention is therefore to be determined by the appended claims.

What is claimed is:

1. A test mechanism for vehicle frames including a spindle means comprising; (a) fixture means attached to said spindle means, (b) means mounted fixed relative to a planar surface for imposing a varying vertical loading on said fixture means, (c) means for imposing a varying torsional loading on said spindle means, and (d) means attached to said frame at the longitudinal pitch axis thereof for imposing an inertia loading on said frame, (e) whereby said test mechanism closely simulates frame loading due to at least a portion of road conditions.

2. A dynamic test machine for a structure comprising; (a) a plurality of floor mounted vertically reciprocating means for supporting and applying loading to said structure, (b) a plurality of horizontally reciprocating means for applying torque loading for said structure, and (c) a link means pivotally attached to said structure for imparting thereto an inertia loading.

3. A test mechanism for a vehicle frame having a front and rear axle end means comprising; (a) vertical reciprocating means for vertically loading said front and rear axle end means, (b) means attached to said front and rear axle end means for imposing a cyclic torque loading thereto, and (c) fixture means connected between said vertical reciprocating means and said front and rear axle end means for isolating the deforming movement of said front and rear axle end means from said vertical reciprocating means.

4. A fixture for securing a moving end of an element having an axial extent comprising; (a) means providing for linear movement of said element transverse to said axial extent including spring means for limiting said linear movement, (b) means providing for universal rotary motion of said element, and (c) means mounted within said last mentioned means for providing for linear movement of said element in the direction of its axial extent.

5. A dynamic testing machine and vehicular frame mounted thereon in combination comprising; (a) vertical reciprocating means for cyclically loading said test frame in a vertical direction, (b) horizontal reciprocating means for cyclically loading said test frame in torsion, (c) link means attached to said frame for imposing inertia loading thereon, and (d) fixture means disposed between said vertical reciprocating means and said test frame for isolating said vertical reciprocating means from said torsion and inertia loading.

6. The combination set out in claim 5 wherein said vehicular frame includes; (a) a body simulating means comprising a series of transverse and longitudinal members adjustably connected together, and an adjustable cross frame adjustably connected to said transverse and longitudinal frame members for providing torsional rigidity to said body simulating means.

7. A test mechanism for a vehicle frame including an axle means comprising; (a) fixture means attached to said axle means, (b) means fixed relative to a planar, surface for imposing a varying vertical loading on said fixture means, (c) means fixed relative to said planar surface for imposing a varying torsional loading on said axle means, (d) means attached to said frame at the longitudinal pitch axis thereof for imposing inertia loading on said frame, (e) means fixed relative to said planar surface for imposing a varying side loading on said vehicular frame, and (f) means attached to said axle means for opposing the loading imposed by said side loading means, (g) whereby said test mechanism closely simulates loading conditions encountered by a vehicle traversing a road.

8. A fixture for securing a moving end of an element having an axial extent comprising; (a) inner sleeve means attached to said element for providing for linear bearing movement of said element of axial extent, (b) outer sleeve means for bearingly guiding said inner sleeve means in its linear bearing movement, (c) uniball means fixedly mounting said outer sleeve means, (d) spherical bearing means mounting said uniball means for rotary and angular movement, (e) spacer block means fixedly mounting said spherical bearing means relative thereto, (f) frame means mounting said spacer block means for linear movement relative to said frame means, said linear movement of said spacer block means being transverse to said linear movement of said inner sleeve means, and (g) means mounting said frame means fixedly relative to a planar surface, (h) whereby said element of axial extent is freely movably mounted relative to said planar surface.

9. The fixture set out in claim 8 wherein resilient means are interposed between said spacer block means and said frame means whereby shock abutment of said spacer block means against said frame means is prevented.

10. The combination set out in claim 8 wherein said means mounting said frame means includes vertically reciprocating means.

11. The combination set out in claim 8 wherein said frame mounting means comprises hydraulically actuated reciprocating piston means.

12. A test mechanism for vehicle frame including an axle means comprising; (a) fixture means for freely mounting said axle means for angular, rotational and linear movement, (b) vertical reciprocating means disposed below and attached to said fixture means for reciprocatingly supporting the same, (c) first linkage means attached to said axle means for providing a turning movement therefor, (d) first horizontally reciprocating means driving said first linkage means, (e) second linkage means attached to said vehicle frame for opposing the force imparted to said vehicular frame by said first linkage means, said second linkage means being disposed in a plane extending generally parallel with the plane of said first linkage means, (f) third linkage means attached to said vehicle frame for providing a load on said frame in a direction parallel to the linear extent of said axle means, (g) second horizontally reciprocating means for driving said third linkage means, and (h) fourth linkage means attached at the center line of said axle for opposing at least a portion of said force of said third linkage means, (i) whereby said test mechanism substantially simulates road conditions.

13. The combination set out in claim 12 wherein said vehicle frame includes a series of parallel and horizontal stringer members, said members being adjustably connected together.

14. The combination set out in claim 12 wherein each of said linkage means is disposed generally horizontally when said first and second horizontal reciprocating means are at substantially the midpoint of their travel.

15. The combination set out in claim 12 wherein each of said first and second horizontal reciprocating means and said second and fourth linkage means are provided with support means, said support means disposing the first and second horizontal reciprocating means and said second and fourth linkage means above said planar surface.

16. The test mechanism set out in claim 12 wherein said fixture means comprises; (a) inner sleeve means attached to said axle, (b) outer sleeve means for bearingly guiding said inner sleeve means in a linear movement, (c) uniball means fixedly mounting said outer sleeve means, (d) spherical bearing means mounting said uniball means for rotary and angular movement, and (e) frame means mounting said spherical bearing means for transverse movement relative to said inner sleeve means.

17. The test mechanism set out in claim 16 wherein the frame means mounting the spherical bearing means is supported by said vertically reciprocating means.

References Cited

UNITED STATES PATENTS

| 1,579,178 | 3/1926 | Reynolds | 308—33 |
| 2,799,158 | 7/1957 | Federspiel | 73—71.7 |
| 3,066,898 | 12/1962 | Haynes | 248—23 |
| 3,248,077 | 4/1966 | Charles | 248—23 |

FOREIGN PATENTS 852,452  10/1960  Great Britain.

RICHARD C. QUEISSER, Primary Examiner

JERRY W. MYRACLE, Assistant Examiner

U.S. Cl. X.R.

308—33